United States Patent
Lang

(10) Patent No.: US 11,964,652 B2
(45) Date of Patent: Apr. 23, 2024

(54) METHOD FOR OPERATING A MOTOR VEHICLE IN A COLLISION SITUATION AND MOTOR VEHICLE

(71) Applicant: AUDI AG, Ingolstadt (DE)

(72) Inventor: Markus Lang, Schernfeld (DE)

(73) Assignee: AUDI AG, Ingolstadt (DE)

( * ) Notice: Subject to any disclaimer, the term of this patent is extended or adjusted under 35 U.S.C. 154(b) by 96 days.

(21) Appl. No.: 17/619,385

(22) PCT Filed: Apr. 2, 2020

(86) PCT No.: PCT/EP2020/059329
§ 371 (c)(1),
(2) Date: Dec. 15, 2021

(87) PCT Pub. No.: WO2021/001071
PCT Pub. Date: Jan. 7, 2021

(65) Prior Publication Data
US 2022/0363246 A1  Nov. 17, 2022

(30) Foreign Application Priority Data

Jul. 3, 2019 (DE) .......................... 102019209728.6

(51) Int. Cl.
*B60W 30/085* (2012.01)
*B60W 40/08* (2012.01)

(52) U.S. Cl.
CPC .......... *B60W 30/085* (2013.01); *B60W 40/08* (2013.01); *B60W 2554/4049* (2020.02)

(58) Field of Classification Search
CPC ............... B60W 30/085; B60W 40/08; B60W 2554/4049; B60W 2420/42; B60W 2420/52; B60W 2540/227; B60W 2556/45
See application file for complete search history.

(56) References Cited

U.S. PATENT DOCUMENTS

| | | | | |
|---|---|---|---|---|
| 9,701,307 | B1 * | 7/2017 | Newman | B60W 30/09 |
| 2013/0261869 | A1 * | 10/2013 | Brenneis | B60W 30/08 |
| | | | | 701/23 |
| 2017/0008518 | A1 * | 1/2017 | Arndt | B60W 30/09 |

FOREIGN PATENT DOCUMENTS

| | | |
|---|---|---|
| CN | 101475002 A | 7/2009 |
| CN | 205632377 U * | 10/2016 |

(Continued)

OTHER PUBLICATIONS

Examination Report dated Jan. 16, 2020 in corresponding German Patent Application No. 102019209728.6; 16 pages with English Translation.

(Continued)

*Primary Examiner* — Peter D Nolan
*Assistant Examiner* — Anwar Mohamed
(74) *Attorney, Agent, or Firm* — Maier & Maier, PLLC

(57) ABSTRACT

A method for operating a motor vehicle in the event of an unavoidable collision with a collision object, in particular another vehicle. Environment data relating to the collision object are determined by an environment sensor device including at least one environment sensor and are evaluated to determine at least one driving intervention information for reducing the consequences of a collision. The motor vehicle is automatically guided in accordance with the driving intervention information, and the evaluation of the environment data is carried out together with structural information of the own motor vehicle describing the vehicle structure, in particular including elements absorbing collision energy of the motor vehicle, in such a way that a changed collision point maximizing the deformation energy absorbed by the vehicle structure and to be produced by the driving intervention information is determined when the driving intervention information is determined.

11 Claims, 2 Drawing Sheets

(56) References Cited

FOREIGN PATENT DOCUMENTS

| | | | |
|---|---|---|---|
| CN | 106240565 A | 12/2016 | |
| DE | 19741631 A1 | 3/1999 | |
| DE | 10329567 A1 | 2/2005 | |
| DE | 102006033743 A1 | 10/2007 | |
| DE | 102011115875 A1 | 4/2013 | |
| DE | 102011115875 A1 * | 4/2013 | ......... B60R 21/0132 |
| DE | 102013020474 A1 | 6/2015 | |
| DE | 102014210607 A1 | 12/2015 | |
| DE | 102016005113 A1 | 2/2017 | |
| DE | 102017202537 A1 | 8/2018 | |
| DE | 102017115988 A1 | 1/2019 | |
| DE | 102018006192 A1 | 2/2019 | |
| JP | 200824108 A | 2/2008 | |
| JP | 2008024108 A * | 2/2008 | |

OTHER PUBLICATIONS

Burg et al., "Handbuch Verkehrsunfallrekonstruktion"; Springer Viewing; 2009; 4 pages with English Translation.

International Preliminary Report on Patentability with English translation dated Oct. 26, 2021, in corresponding International Application No. PCT/EP2020/059329; 20 pages with English Translation.

Adamec et al., "Technical and biomechanical aspects of legal assessment of whiplash-associated disorders", Rechtsmedizin, 2017, vol. 27, 5; 34 pages with English Translation.

Wech., "Traffic accident analysis and passive vehicle safety", Engineering TU Munich; WS 2006/07; 2 pages with English Translation.

International Search Report (with English Translation) and Written Opinion (with Machine Translation) dated Jul. 8, 2020 in corresponding International Patent Application No. PCT/EP2020/059329; 15 pages.

Office Action dated Oct. 26, 2023, in corresponding Chinese Application No. 202080048937.X, 10 pages.

* cited by examiner

METHOD FOR OPERATING A MOTOR VEHICLE IN A COLLISION SITUATION AND MOTOR VEHICLE

FIELD

The invention relates to a method for operating a motor vehicle in the event of an unavoidable collision with a collision object, in particular another vehicle, wherein environment data relating to the collision object are determined by means of an environment sensor device comprising at least one environment sensor and are evaluated to determine at least one driving intervention information for reducing the consequences of a collision, wherein the motor vehicle is automatically guided in accordance with the driving intervention information. In addition, the invention relates to a motor vehicle.

BACKGROUND

Collision avoidance and/or collision consequence reduction functions are an important area of research as far as the safety of modern motor vehicles is concerned. Safety systems are already known in the prior art that are able, for example, to detect an imminent and/or ongoing crash, i.e. a collision, by means of corresponding collision sensors, which may include for example distance sensors and/or acceleration sensors that measure the acceleration of elements of the motor vehicle body. If an imminent and/or occurring collision is detected, which can be determined based on, for example, a collision parameter such as a time to collision (TTC) and/or a collision probability, measures can be triggered to increase safety within the motor vehicle. For example, it is conceivable to control occupant restraint systems, in particular airbags and/or seatbelt tensioners, and/or to bring the motor vehicle into a more collision-safe state, for example by closing windows and/or sunroofs.

However, safety systems also include those that can determine the risk of a collision or even its unavoidability well in advance of a collision, for which ambient data from an ambient sensor device, for example comprising radar sensors and/or optical sensors, can usually be evaluated. Measures can then also include visual and/or audible warnings to the driver, wherein in the case of unavoidable collisions, it has also already been suggested to prepare the hearing for higher noise levels during the collision by means of a background noise.

Safety with regard to any collisions that may occur in motor vehicles is also increased by appropriate design of the motor vehicle body, for example by creating so-called "crumple zones". To this end, for example, certain elements such as side members, cross members and the like are installed within the motor vehicle, which are intended to convert part of the collision energy into deformation energy and thus keep it away from occupants of the motor vehicle and/or relevant vehicle systems.

DE 10 2017 202 537 A1 concerns a method for protecting a device for an autonomous vehicle in the event of a collision of the vehicle with an accident object. There, it is proposed to determine a probable collision point between the accident object and the vehicle from environment signals of an environment sensor device, to select a preferred collision point in dependence thereon, and to change the orientation of the vehicle by means of an orientation signal so that a shift of the probable collision point to the preferred collision point is effected. The purpose of this displacement is to protect important equipment, such as an environment sensor device or communication equipment of the vehicle, since it might no longer be possible to continue driving the vehicle if they were damaged. Consequently, the collision point to be moved to will be one where the collision is likely to cause no damage or as little damage as possible to the equipment.

DE 10 2017 115 988 A1 concerns modifying a trajectory depending on an object classification. There, in a method for automated operation of a vehicle, when an object is detected in an area corresponding to a trajectory, the object is to be classified, wherein the path of movement of the trajectory is modified as a function of the classification of the detected object in order, for example, to be able to avoid objects during automated parking.

DE 103 29 567 A1 concerns a device and a method for reducing the risk of injury to vehicle occupants in the event of an accident. An evaluation device cooperating with an object recognition device detects whether a collision between the driver's own vehicle and the other vehicle is unavoidable, wherein direction change devices then are activated in such a way that the unavoidable collision takes place in an area of another vehicle, so that the danger to the occupants of both vehicles is minimized. Specifically, the impact area should be the front side area or the rear side area to avoid the passenger cell as much as possible.

The problem is that the intended vehicle body structures, for example side members, cross members and the like, are only used by the coincidence of the crash position. For example, a frontal collision without involvement of the side member results in a higher damage input to the motor vehicle than if it were included. It should also be noted that vehicle drivers instinctively steer away from oncoming traffic, even when it would make more sense to use a larger overlap area for the collision.

SUMMARY

It is therefore the object of the invention to provide a means of improving collision behavior in unavoidable collisions with a motor vehicle.

As a solution to this object, a method of the type mentioned at the beginning of the invention provides that the evaluation of the environment data together with structural information of the own motor vehicle describing the vehicle structure, in particular comprising elements absorbing collision energy of the motor vehicle, in such a way that a changed collision point maximizing the deformation energy absorbed by the vehicle structure and to be produced by the driving intervention information is determined during the determination of the driving intervention information.

According to the invention, it is therefore proposed to make optimum use of the vehicle's own structure in the event of an unavoidable collision by determining a changed collision point, for example as the initial contact point, on the basis of an originally determinable collision position, i.e. an original collision point, at which the structures present in the motor vehicle and absorbing energy by deformation can be utilized more effectively as a result of the impact taking place, i.e. more of the collision energy is converted into deformation energy, which contributes to increasing the safety of occupants of the motor vehicle. Driver intervention information is determined via which the changed collision point is reached, which is implemented accordingly in a vehicle system suitable for at least partially automatic guidance of the motor vehicle, so that the collision point of the motor vehicle with the collision object is no longer a random product of the human reaction, but is brought about in a targeted manner in order to maximize the proportion of the collision energy that is converted into deformation energy. In this case, the collision point is determined on the basis of the energetic properties of at least the motor vehicle, which are particularly advantageously described by the structural information.

The structure of a modern vehicle contains a large number of elements that are not only intended, for example, to stabilize the passenger cell and thus protect the occupants inside, but are also specifically provided to convert as much of the collision energy as possible into deformation energy if they are loaded accordingly. In other words, it can also be said that the vehicle body contains elements that absorb or assimilate collision energy and consume it, especially through deformation. Such elements can be, for example, side and cross members within the motor vehicle. Such elements can be realized, for example, from high-strength steel or solid steel. Of course, it is also known to use predetermined breaking points or predetermined deformation points leading to certain deformations and the like, in particular to realize certain so-called "crumple zones" within the motor vehicle. The structural information describing the vehicle structure at least with respect to these deformation and energy absorption properties can, for example, define collision energy absorbing elements and their interactions. Preferably, energy data describing the collision energy absorption behavior or collision energy conversion behavior can be assigned to the elements. In particular, the structural information can be a basis for a model that can be used to simulate and/or calculate the collision, i.e. to determine which deformations occur in the given collision situation at corresponding collision points. The collision point refers in particular to the initial contact point, i.e. the place where the first contact of the motor vehicle with the collision object takes place during the collision.

Specifically, in the context of the present invention, as far as the evaluation is concerned, the following steps can thus be provided:
  Evaluation of the environment data for determining at least one collision information describing the collision, in particular a collision time and/or a collision position and/or a collision speed, and/or object information describing the collision object, preferably comprising structure information describing the collision properties of the collision object, wherein said collision position can be understood as the original collision point,
  Evaluation of the collision information and/or the object information as well as the structure information to determine the changed collision point, in particular in an optimization method maximizing the deformation energy absorbed by the own motor vehicle and/or under restriction to achievable collision points,
  Determination of the driving intervention information to reach the collision point.

Variants for determining collision information of an imminent collision are already widely known in the prior art. Typical parameters describing a collision are, for example, the collision time, i.e. in particular the time to collision (TTC), the collision speed, the collision angle and/or the collision position, i.e. the original collision point (initial contact). In principle, designs known in the prior art for such purposes can be used as environment sensors of the environment sensor device, so that, for example, it can be provided that an environment sensor device having at least one radar sensor and at least one optical sensor, in particular a camera, is used. Appropriately, as it will be discussed in more detail below, environmental data from an optical sensor can also be used to more accurately determine the aforementioned collision proprieties of the collision object. Radar sensors are particularly suitable for determining dynamic properties of the collision object as well, such as its speed, acceleration and the like. In addition, they serve to determine the distance. The environment sensor device, which can of course also include further environment sensors such as LIDAR sensors and/or ultrasonic sensors, thus makes it possible on the one hand to calculate the driving channel of the accident opponent, i.e. the collision object, wherein these dynamically changing properties, in particular in the case of further vehicles as the collision object, can expediently also be constantly tracked to ensure that the optimum contact point, i.e. the changed collision point, is reached. However, the environment sensor device can further be used to collect additional information about the collision object, which can be of great use in the energetic consideration that is ultimately made to determine the driving intervention information.

Overall, the present invention makes it possible to make the best possible use of structures in the vehicle body, thereby significantly reducing the impact of damage on the occupants as well as the motor vehicle.

In this context, a particularly advantageous further development of the present invention provides that at least one communication information describing at least one property of the collision object is received via a communication device designed for motor vehicle-to-motor vehicle communication, in particular transmitted by the collision object, and is taken into account when determining the changed collision point. Motor vehicle-to-motor vehicle communication (C2C communication) can be used with particular advantage in the context of the method according to the invention, since information that is sometimes difficult to recognize from the outside can be transmitted, for example, to a potential or definite collision partner, especially with regard to collision properties.

Furthermore, communication information can also concern the collision itself. On the one hand, it is conceivable that the communication information is sent triggered, for example when the unavoidable collision is detected, while on the other hand it is also possible, for example with regard to structural information as communication information, to broadcast it regularly or to make it available in principle. It should be noted at this point that further expedient communication with other motor vehicles, in particular the collision object, can also take place and is expedient via such a communication interface provided by a communication device. For example, in the event of a detected risk of accident, information can be transmitted at least to the potential communication partner, and possibly also to other road users. Within the scope of the present invention, it is even conceivable in an expedient embodiment that the motor vehicle and/or the collision object, i.e. in particular the further vehicle, coordinate their driving behavior using respective communication devices in such a way that respective changed collision points are reached. This is particularly useful if the additional vehicle can likewise determine a changed collision point and corresponding driving intervention information. Then the motor vehicles can coordinate with each other, if necessary in a negotiation procedure, so that the respective changed collision points can be reached in an ideal way. Such coordination before a collision can also concern other aspects in addition or alternatively, for example an adjustment of the behavior of the respective collision partner with regard to deceleration peaks, swirl and the like. As for collision warnings that can be received as communication information, these can also be used, for example, to precondition vehicle systems, especially occupant restraint systems, and the like.

In a further development, communication information may also include additional data describing occupants of the collision partner, such as the physical condition of occupants. For example, information on age or otherwise may be appropriate information for determining what rotational and longitudinal accelerations/impulses these occupants can withstand.

In a particularly advantageous embodiment of the present invention, it can be provided that structural information of the collision object is determined from the environment data and/or the communication information, and the determination of the changed collision point is carried out taking into account the structural information of both the own motor vehicle and the collision partner. In other words, structural information of the collision object corresponding in particular to the structural information for the own motor vehicle can be determined in different ways, in particular also by fusion, in particular from the environment data and/or the communication information, so that in the event of an unavoidable collision not only the own vehicle structure can be utilized as optimally as possible, but also the vehicle structure or generally object structure of the collision partner, in this case the collision object. For example, in the case of another vehicle as a collision object, an optimal collision point can thus be determined based on the energetic properties of both vehicles to achieve further improvement.

To derive structural information from environmental data, optical sensors, in particular a camera, can be used to detect and extract information about the object structure, specifically the vehicle structure. For example, with another vehicle as the collision object, it is possible to detect doors, flaps, windows, a radiator grille and the like depending on the viewing angle. This can of course be combined with environmental data from other environmental sensors, such as a radar sensor, so that distances, orientations and the like also follow. In the case of derivation from communication information, this can already directly comprise the structural information, for example here also elements of the vehicle body with associated energy data, or at least provide the basis for determining the structural information of the collision object.

A useful further development of the present invention may also provide that a vehicle type of the collision object is determined from the environment data and/or the communication information, wherein the structure information is retrieved from a database using the vehicle type. The vehicle type, i.e. vehicle type information, can include a manufacturer and a model, for example, which in the simplest case can be sent as part of the communication information, but can also be determined using known methods of environment data processing, in particular image processing, by evaluating the corresponding environment data. Once the vehicle type information has been determined, it can be used to retrieve the appropriate structural information from a database stored in the motor vehicle and/or accessible via a communication link. Such a database, which can be accessed via a communications link, may be accessible, for example, on the Internet and/or via a cellular connection.

In this context, it can be provided that if the vehicle type cannot be determined, default structure information is used. This provides a fallback solution for cases in which no vehicle type can be determined for another vehicle as a collision object or no structural information is available. In such cases, especially simple default structure information can be used. This contains, for example, common vehicle structures, on the basis of which a collision point can also be defined, which provides, for example, a high overlap in the case of a frontal crash and/or a wide-area contact on the elements with high rigidity. Structures or elements of the vehicle body with high rigidity can be, for example, A, B, C, D-pillar and the like.

In general, it can be said in the context of the present invention that the calculations for determining the changed collision point, in particular the deformation energy, can be performed as analytical calculations and/or simulations, in particular using a model included in and/or determined from the structural information.

In a specific embodiment of the present invention, it may be provided that, in addition to maximizing the deformation energy, a minimization of the penetration depth and/or a maximum permissible penetration depth is also taken into account when determining the changed collision point. For example, in the case of multiple optimization goals, a weighting of the different optimization goals can also be performed. Consequently, one objective with regard to the choice of the changed collision point is to dissipate as much collision energy as possible while ensuring or aiming for a low penetration depth into the motor vehicle.

As already mentioned, the structural information of the own motor vehicle (and ideally also the structural information of the collision object) describes the respective, in particular vehicle-specific collision properties, for example, in the case of motor vehicles, specific properties of the body, for example, stiffness, geometric design and the like.

This makes it possible, especially in an optimization process, to use the structural information to draw conclusions about the optimum contact point for force application, i.e. the optimum collision point.

Specifically, it can be provided in this context that the deformation energy is determined from a deformation path in an energy grid method. The energy grid method is already known from accident analysis in the prior art and offers the possibility to determine the sum of the deformation energy based on the deformations. The deformations themselves can be derived, as already explained, from the structural information which, after all, describes collision-relevant properties (collision properties) of the motor vehicle and ideally also of the collision object. In concrete embodiments, for example, a distinction can be made between static and dynamic deformation, since the vehicle body springs out again after a collision. The dynamic deformation path and the static deformation path are linked, for example, as known in the prior art, via the impact number, which can also be derived in a correspondingly known manner. Consequently, in the prior art, a plurality of methods exist for the concrete, at least partially analytical calculation and/or simulation of deformations and for the derivation of corresponding deformation energies.

An extremely advantageous further development of the present invention provides that occupant information describing the position of occupants within the motor vehicle, in particular determined by an occupancy detection device, is also used in determining the changed collision point. More appropriately, for example, known seat occupancy mechanisms can be used to determine the manner in which the passenger cell within the motor vehicle is occupied. For example, different seats within the motor vehicle can be classified as occupied or unoccupied, wherein additional attributes can also be assigned, such as whether an airbag assigned to the seat is activated or deactivated (for example, when a child seat is used). With particular advantage, it can be provided in this context that the occupant information is used to detect clearances of the passenger cell of the motor vehicle that are available for deformations during the collision. If, for example, it is known that there are no occupants in the back seat of a motor vehicle, the corresponding area can be released as a deformable space and accordingly influence the choice of collision point. Of course, the occupant information can also be taken into account in terms of keeping the greatest possible distance from the occupants with regard to deformation and the like.

It is also particularly advantageous if vital information describing the maximum acceleration forces that should act on the occupants is also used when determining the changed collision point, in particular in addition to the occupant information. Occupants of motor vehicles can usually only be subjected to certain longitudinal and/or lateral accelerations or impulses without endangering their health. For this reason, it can be useful to include a "personal injury image" in the determination of the changed collision point, especially with regard to collisions of higher relative speeds. For this purpose, a boundary condition or another optimization criterion can be used, for example in the context of an optimization. For example, a boundary condition may require that certain longitudinal and/or rotational acceleration values should not be exceeded in areas where occupants may be located or are actually located based on the occupant information. Within a control unit that performs the method according to the invention, for example, standard limit values for humans can be stored. However, it is also conceivable to use additional data to determine individual limit values, for example depending on an age, whether for occupants of the own motor vehicle or of the collision object, wherein, for example, the additional data can be part of the communication information, as described above.

The consideration of possible human damage due to excessive accelerations can easily be integrated into the procedure described here, since mechanical processes are considered and calculated/simulated anyway.

Another useful further development of the present invention provides that, in particular when structural information of the motor vehicle formed by another vehicle and occupied by occupants is available, the deformation energy for the collision partner (the collision object) is additionally maximized. In other words, the optimization can also be aimed at increasing safety on both sides, so that increased safety is achieved not only in the motor vehicle but also in the collision partner, wherein such an approach preferably is coupled with the mutual coordination already mentioned via motor vehicle-to-motor vehicle communication.

The present invention may be particularly useful when the motor vehicle is fully automatically guided by a vehicle system. In this case, the driver does not steer or brake/accelerate himself, so that the changed collision point can be implemented particularly easily. However, it is also possible to achieve the corresponding improvements in the case of motor vehicles that are partially automatically and/or fully controlled by the driver, since then, for example, manual control by the driver can also be blocked for an extremely short time in preparation for the collision in order to bring about the collision at the changed collision point.

In any case, however, a vehicle system designed for at least partially automatic guidance of the motor vehicle can be used to control the corresponding actuators in accordance with the driving intervention information.

In addition to the method, the present invention also relates to a motor vehicle, comprising an environment sensor device and a control unit designed to carry out the method according to the invention. All the explanations regarding the method according to the invention can be applied analogously to the motor vehicle according to the invention, with which the advantages already mentioned can also be obtained. In particular, the motor vehicle may also include a communication device for motor vehicle-to-motor vehicle communication and/or for communication with a database of structural information. Furthermore, the motor vehicle may comprise a vehicle system for at least partially, in particular completely, automatic guidance of the motor vehicle or, in general, a vehicle system for performing driving interventions.

The motor vehicle usually has a body and/or further elements of the vehicle structure, the collision-relevant properties of which can be described by the structural information, wherein in particular energy data describing the collision energy absorption capability can be assigned to different elements of the vehicle structure described by the structural information. The structural information expediently also describes the mechanical connections between individual elements and/or the body and/or the relevant mechanical properties, for example stiffness and/or material and the like.

BRIEF DESCRIPTION OF THE FIGURES

Further advantages and details of the present invention will be apparent from the exemplary embodiments described below and from the drawing. Showing.

DETAILED DESCRIPTION

Figure 1:
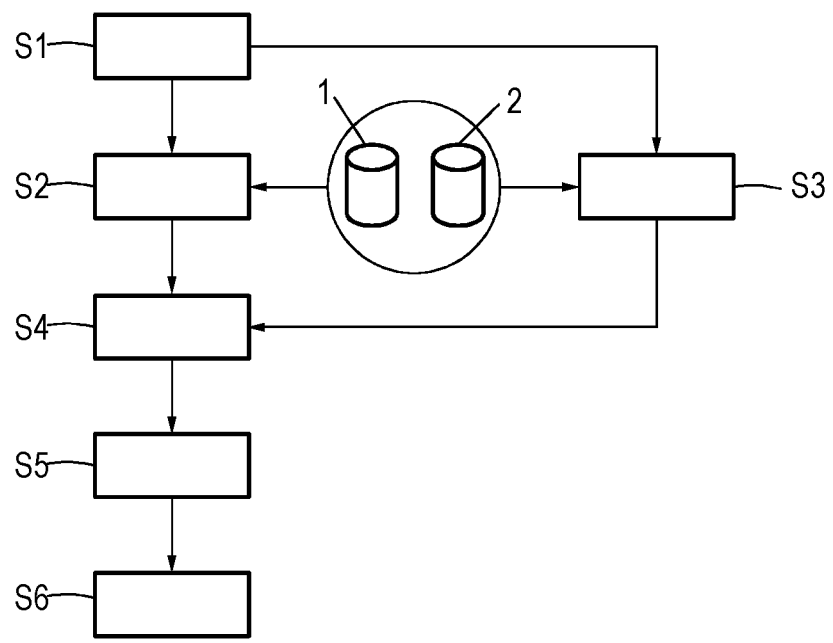
FIG. 1 a flow chart of an exemplary embodiment of the method according to the invention, FIG. 2 a side view of a motor vehicle with collision energy absorbing elements, FIG. 3 a front view of the motor vehicle of FIG. 2, FIG. 4 a sketch explaining the choice of a collision point, and FIG. 5 a schematic sketch of a motor vehicle according to the invention.

FIG. 1 shows a flow diagram of an exemplary embodiment of a method according to the invention. In the present case, a collision situation between a motor vehicle and another vehicle is assumed as the collision object. The collision is unavoidable in this case.

In this case, the unavoidability of the impending collision is determined in a step S1. Accordingly, preparatory information is determined in steps S2 and S3, specifically collision information in step S2 and structural information concerning the further vehicle in step S3. In both step S2 and step S3, both environment data 1 of an environment sensor device of the motor vehicle and communication information 2 sent from the further vehicle and received by means of a communication device of the motor vehicle are evaluated. The collision information determined in step S2 comprises, for example, a time to collision (TTC), i.e. collision time, a collision speed and/or a collision angle, wherein a collision position at which the other vehicle and the motor vehicle first make contact during the collision is also determined as the original collision point.

Since structural information is already available for the vehicle, corresponding structural information is also determined for the other vehicle in step S3. The structural information for the own vehicle and the other vehicle describes, in general terms, the collision properties of the own vehicle and the other vehicle, in particular which deformations occur and how much deformation energy is absorbed, i.e. how much collision energy is consumed for the corresponding deformations. The structural information describes the structural design of the respective vehicles, i.e. the vehicle body itself. The structural information thus includes, for example, information on the vehicle body, in particular on specific elements of the same and/or on other elements stabilizing the motor vehicle, such as cross members and/or side members. Furthermore, the structural information also includes relevant other components of the vehicle body, for example information on the engine, which can also absorb collision energy in the form of deformations. At least some of the elements described by the structural information are associated with energy data describing how the elements are able to absorb collision energy and convert it into deformation. Of course, the structural information also describes how the elements it contains are mechanically coupled. Energy data can describe mechanical and/or design properties of the respective elements, for example their stiffness and/or material.

In particular, a model for calculating the collision for a specific collision point can be derived from the structural information and/or this model can already be directly contained in the structural information.

In order to determine structural information also for the further vehicle in step S3, two main ways are conceivable, which can also be used in combination. On the one hand, after the environment sensor device contains at least one camera and at least one radar sensor as environment sensors, it is possible to evaluate optical environment data in order to draw conclusions about relevant elements of the vehicle body, for example to detect doors, flaps, windows, a radiator grille, mudguards and the like, also with regard to their shape and relative position. However, it is preferred to determine a vehicle type from the communication information 2 or also from the optical environment data 1, specifically vehicle type information describing the vehicle type, in order to use it to retrieve the structural information for the further vehicle from a database, which may be available within the motor vehicle, for example, or may also be accessed via a communication link, for example on a back-end facility on the Internet.

Figure 2:
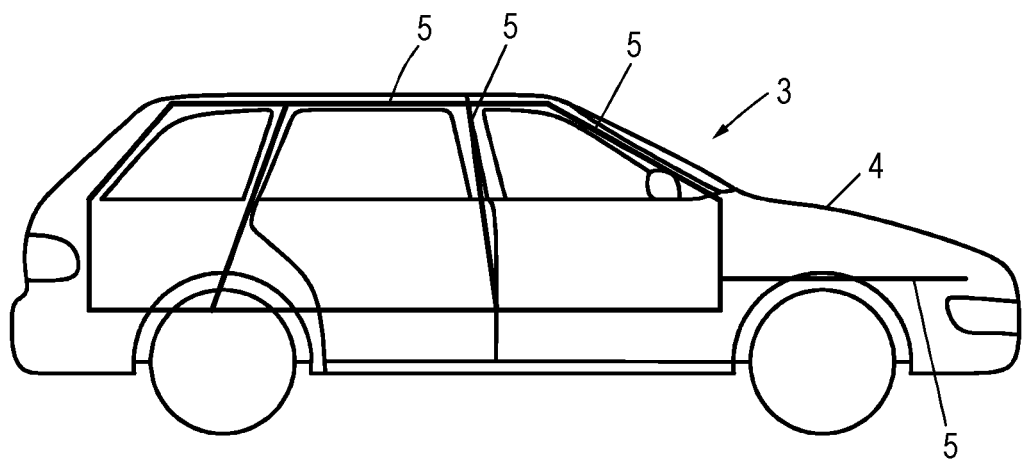
Figure 3:
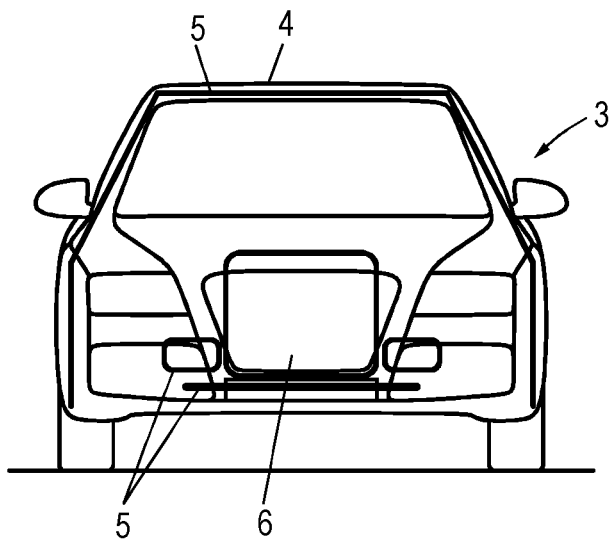

FIG. 2 shows an example of a schematic side view of a motor vehicle 1 with a body 4, wherein the motor vehicle has a plurality of collision-relevant elements 5 that can be described by the structural information. For example, the elements 5 can be made of high-strength steel and/or solid steel and/or be side and cross members. FIG. 3 shows a corresponding front view, in which the motor 6 is also shown as a collision-relevant element.

In a step S4, the respective structural information is used to find, starting from the original collision point, an improved, changed collision point in the space still reachable by driving interventions, for which the deformation energy absorbed by the vehicle structure is maximized. This means that an optimization method is used to find a collision point for which as much collision energy as possible is converted into deformation energy. In this case, the penetration depth of the other vehicle into the own vehicle 3 is also limited or, secondarily, minimized, in this case with a lower weighting. Finally, occupant information and vital information provided from an occupancy detection device, for example, for detecting seat occupancy, also enter step S4. In this way, further free spaces available for deformation that are not occupied by occupants can be determined and optimization can be performed with regard to the positions of the occupants. Furthermore, due to the vital information, too strong accelerations at the occupants' positions can be avoided.

For example, the models of the motor vehicle 3 and the other vehicle contained in or derivable from the structural information can be used to initially determine deformation paths by simulation and/or analytical calculation. With the help of the energy grid method, corresponding deformation energies can be derived from these deformation paths. Corresponding methodologies have already been proposed in the field of accident analysis and can also be used in the context of the present invention.

Figure 4:
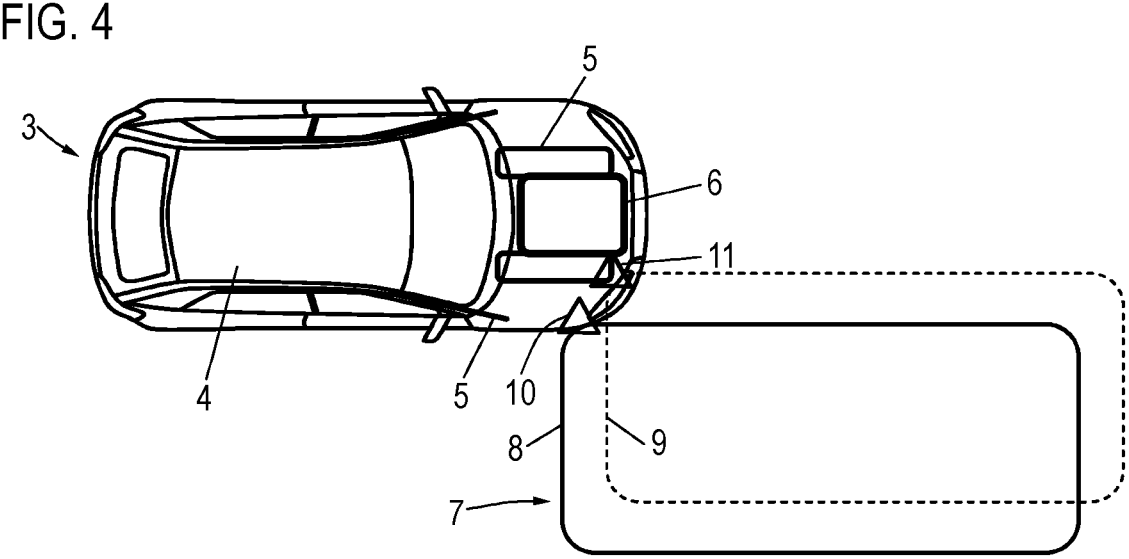

In summary, in step S4 an energetic consideration is carried out in order to maximize the deformation energy while limiting the penetration depth of the further vehicle, i.e. to select an impact position in such a way that a large part of the collision energy is converted into deformation energy and the occupants and the own motor vehicle 3 are optimally protected. This will be explained again in more detail with reference to FIG. 4, which again indicates the motor vehicle 3 and some relevant elements 5, in particular also the motor 6. Furthermore, two conceivable positions 8, 9 of the further vehicle 7 as collision object with the respective collision points 10, 11 are indicated once with a solid line and once dashed. If, for example, the position 8 of the further vehicle 7 is assumed to be the same as the original position point 10, it should be noted that the original collision point 10 is not located on an element 5 or the motor 6, but only on chassis parts, as a result of which only a small proportion of the collision energy can be absorbed and a higher penetration depth of the further vehicle 7 into the vehicle structure of the own motor vehicle 3 results. However, in contrast, the dashed position 9 has a changed collision point 11, which is located on a structural point that can absorb a lot of collision energy. In this way, the harmful influences on the occupants are reduced.

Advantageously, in step S4 the structural information of both the own motor vehicle 3 and the further vehicle 7 is taken into account, so that the vehicle structure of both vehicles 3, 7, which can also be referred to as the crash structure in its collision-relevant portion, can be optimally utilized.

In a step S5 of FIG. 1, driving intervention information for which the driving interventions described herein bring about the optimum changed collision point 11 determined in step S4 is determined accordingly. By means of a vehicle system designed for fully automatic guidance of the motor vehicle 3, the driving interventions described by the driving intervention information, in particular comprising lateral and/or longitudinal interventions, are implemented in a step S6.

It should also be noted that a continuous update, in particular by further tracking of the collision object in the environment data 1, is expediently carried out in order to also be able to react to maneuvers of the further vehicle 7. Coordination can also take place via the aforementioned motor vehicle-to-motor vehicle communication. Especially with such a coordination, the optimization in step S4 can also be performed in such a way that an optimal, changed collision point 11 results for the further vehicle 7 as well.

The method described here is ideally used when the own motor vehicle 3 is operated partially or completely automatically, wherein it is also possible to use it during manual operation, in which case the manual control options can be blocked for a short time before the collision.

Figure 5:
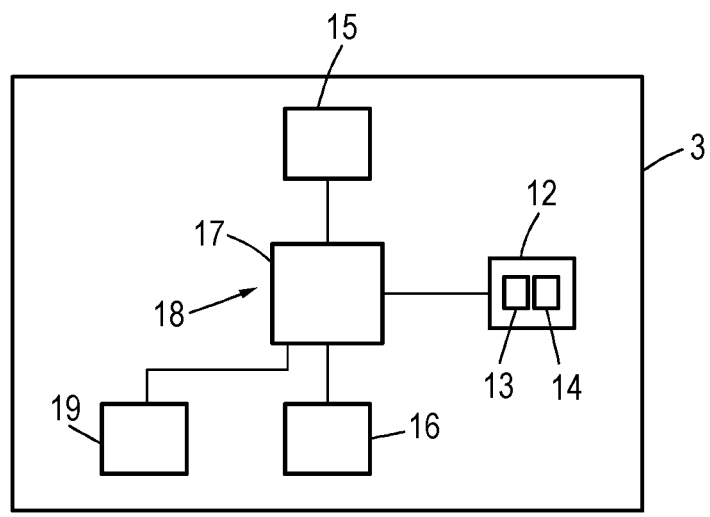

FIG. 5 shows ultimately a functional principle sketch of a vehicle motor 3 according to the invention. As already mentioned, this firstly has the environment sensor device 12, which in this case has at least one radar sensor 13 and at least one camera 14 as environment sensors. The environment data of the environment sensor device 12, just like the communication information of a communication device 15 and an occupant information of an occupancy detection device 16, are provided to a control unit 17 of a safety system 18 which is designed to carry out the method according to the invention. The control unit 17 may also store the structural information of the own motor vehicle 3. A database containing structural information of various vehicle types is preferably addressable via the Internet by means of a corresponding interface of the communication device 15.

To implement the driving intervention information, the control unit 17 can control a vehicle system 19 designed for fully automatic vehicle guidance of the motor vehicle 3.

The invention claimed is:

1. A method for operating a motor vehicle in the event of an unavoidable collision with a collision object comprising:
   determining environment data relating to the collision object, by an environment sensor device comprising at least one environment sensor;
   evaluating the environment data to determine at least one driving intervention information for collision consequence reduction; and
   automatically guiding the motor vehicle in accordance with the driving intervention information;
   wherein evaluation of the environment data is carried out together with structural information of the motor vehicle describing structure of the motor vehicle, the structural information further comprising elements absorbing collision energy of the motor vehicle;
   wherein the evaluation of the environment data is carried out in such a way that, when the driving intervention information is determined, a changed collision point maximizing the deformation energy absorbed by the vehicle structure and to be produced by the driving intervention information is determined;
   wherein determination of the deformation energy from a deformation path is carried out in an energy grid method; and
   wherein, when determining the changed collision point, in addition to maximizing the deformation energy, one or both of a penetration depth of the collision object into the motor vehicle is minimized and a maximum permissible penetration depth of the collision object into the motor vehicle is determined.

2. The method according to claim 1, wherein at least one communication information describing at least one property of the collision object is transmitted by the collision object and received via a communication device designed for motor vehicle-to-motor vehicle communication, and is taken into account in determining the changed collision point.

3. The method according to claim 1, wherein structural information of the collision object is determined from the environment data and/or the communication information, and the determination of the changed collision point is carried out taking into account the structural information of both the motor vehicle and the collision object.

4. The method according to claim 3, wherein the collision object is a vehicle, and a vehicle type of the collision object is determined from the environment data and/or the communication information, wherein the structure information is retrieved from a database using the vehicle type.

5. The method according to claim 1, wherein one or more of occupant information describing a position of at least one occupant within the motor vehicle, and vital information describing maximal acceleration forces which would act on the at least one occupant, is also used in determining the changed collision point.

6. The method according to claim 5, wherein the occupant information is used to detect clearances of a passenger cell of the motor vehicle which are available for deformations during the collision.

7. The method according to claim 1, wherein the motor vehicle is guided completely automatically by a vehicle system.

8. A motor vehicle, comprising:
   an environment sensor device including at least one environment sensor; and
   a control unit;
   wherein environment data relating to the collision object are determined by the environment sensor device and are evaluated to determine at least one driving intervention information for collision consequence reduction;
   wherein the motor vehicle is automatically guided in accordance with the driving intervention information;
   wherein evaluation of the environment data is carried out together with structural information of the motor vehicle describing structure of the motor vehicle, the structural information further comprising elements absorbing collision energy of the motor vehicle;
   wherein the evaluation of the environment data is carried out in such a way that, when the driving intervention information is determined, a changed collision point maximizing the deformation energy absorbed by the vehicle structure and to be produced by the driving intervention information is determined;
   wherein determination of the deformation energy from a deformation path is carried out in an energy grid method; and
   wherein, when determining the changed collision point, in addition to maximizing the deformation energy, one or both of a penetration depth is minimized and a maximum permissible penetration depth is determined.

9. The method according to claim 2, wherein structural information of the collision object is determined from the environment data and/or the communication information, and the determination of the changed collision point is carried out taking into account the structural information of both the motor vehicle and the collision object.

10. The method according to claim 2, wherein one or more of occupant information describing a position of at least one occupant within the motor vehicle, and vital information describing maximal acceleration forces which would act on the at least one occupant, is also used in determining the changed collision point.

11. The method according to claim 3, wherein one or more of occupant information describing a position of at least one occupant within the motor vehicle, and vital information describing maximal acceleration forces which would act on the occupants, is also used in determining the changed collision point.

* * * * *